June 7, 1932.  R. P. F. LIDDELL  1,861,576
FILTER
Filed March 13, 1926

Inventor
Robert P. F. Liddell
By his Attorneys,
Kenyon & Kenyon

UNITED STATES PATENT OFFICE

ROBERT P. F. LIDDELL, OF NEW YORK, N. Y., ASSIGNOR, BY MESNE ASSIGNMENTS, TO CENTRAL UNION TRUST COMPANY OF NEW YORK, TRUSTEE

FILTER

Application filed March 13, 1926. Serial No. 94,395.

This invention relates to filters, and more especially to filters for use in connection with internal combustion engines for purifying the lubricating oil.

An object of this invention is a compact and inexpensive filtering unit which has a large filtering surface, is easy of manufacture, and in which the possibility of leakage into or out of the filtering unit is obviated.

One way of attaining this object is by wrapping a drainage member enclosed in an envelope of filtering cloth and a spacing member into spiral form and providing a conduit extending into the inner end of the unit through an aperture in the filtering cloth. The unit may be contained within a cylindrical casing through one end of which extends the conduit. Oil may be supplied to the casing in any suitable manner under pressure and will be forced into the spaces provided by the spacing member, and thence through the filtering cloth and along the drainage member to the conduit, where it will be discharged from the filter.

Other objects, novel features and advantages of this invention will be apparent from the following specification and accompanying drawing, wherein Figure 1 is a perspective view partially broken away of a filter embodying the invention;

Figure 1:
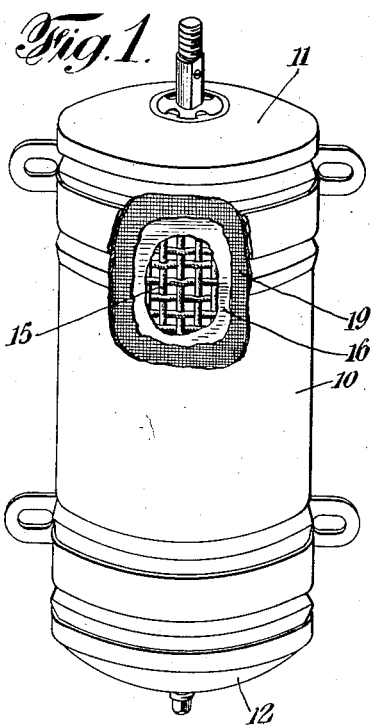
Figure 2:
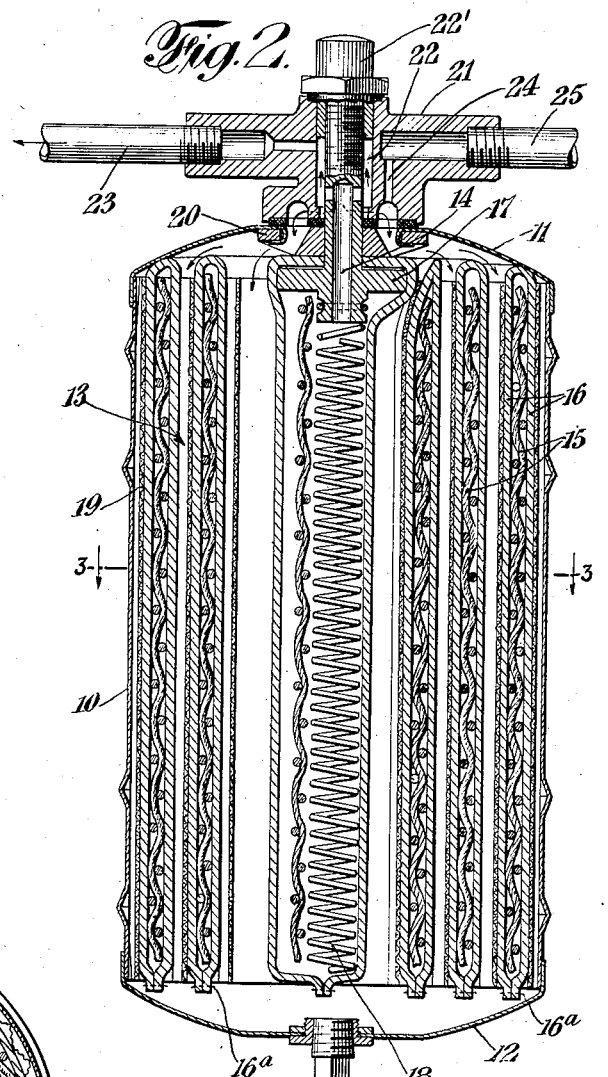
Fig. 2 is an enlarged vertical section through the filter.
Figure 3:
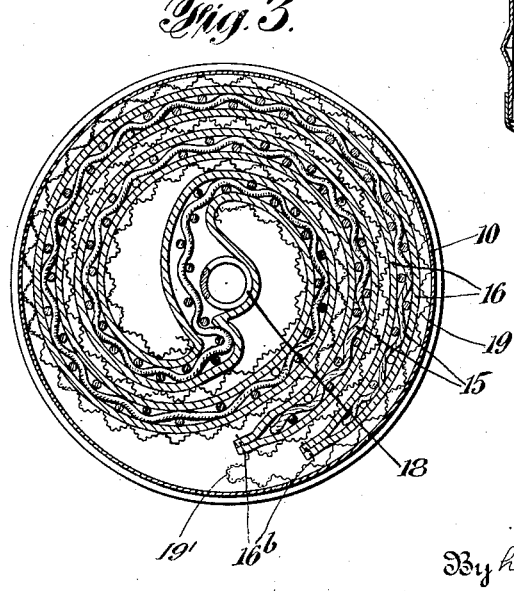
Fig. 3 is a section on the line 3—3 of Fig. 2.

The filter casing 10 is preferably cylindrical and is provided with caps 11 and 12 at the top and bottom respectively. Within the casing is provided a filtering unit 13 which comprises a spiral filtering member, the turns of which are slightly separated by spacing means, so that substantially the full surface of the filtering unit is exposed to oil to be filtered. An outlet conduit 14 extends preferably from the inner end of the filtering member through the casing. Preferably the filtering member comprises a drainage member 15 enclosed in an envelope 16 of filtering cloth. The filtering member is preferably connected at substantially its middle with the outlet conduit 14 which is provided with a collar 17, the conduit and collar being inserted through an aperture in the filter cloth. A spacing member 18, preferably a wire helix, extends from the end of the conduit 14 substantially the full width of the filtering member. Starting from the member 18, the filtering member is wrapped to form a double spiral. Between adjacent spirals of the filtering member are arranged spacing members. Preferably, these members comprise a single strip of material 19, doubled as at 19', and arranged with its ends terminating near the spacing member 18.

The drainage member 15 may be of any suitable material which will provide between the layers of filter cloth a channel through which oil may flow to the conduit 14. A length of coarsely woven jute has been found to be very satisfactory. Other woven materials, either of fibre or metal, may, however, be used. The envelope 16 for the drainage member preferably comprises a single length of filter cloth folded lengthwise and stitched together at its edges and ends, as at 16a and 16b, to form a complete envelope. The smooth face of the filtering cloth is arranged adjacent the drainage member and the nap side is exposed to the oil in the filter casing, as the oil is filtered by being passed from the outside to the inside of the envelope. The spacing member 19 is preferably composed of wire screening, although it may be of any other suitable material which will keep spaced the adjacent spirals sufficiently to permit oil to come in contact with the whole surface of the filtering unit. Although the spacing member 18 is here shown as a wire helix, it may be of any other form which will provide a free space for oil to pass freely into the end of the outlet conduit 14.

In alignment with the aperture in the cover 11 through which the outlet conduit 14 passes is provided a collar 20, between which and the collar 17 is clamped that portion of the filtering cloth adjacent the aperture through which the outlet conduit 14 extends. A fitting 21 has a passageway 22 therethrough into which extends the conduit 14, the outer end of which is threaded to receive a nut 22' by means of which the fitting is clamped to the casing and the collar 17 is drawn toward the collar 20 to clamp therebetween the filter cloth which acts as a gasket. The conduit 14 is provided with ports through which oil may pass from the conduit into the passageway 22, from whence it passes to the outlet pipe 23. In the fitting 21 is provided an inlet channel 24 communicating with ports in the cover 11 by means of which oil is supplied to the filter from the inlet pipe 25.

Oil is supplied to the filter through the pipe 25 and the channel 24 and flows into the spaces formed between the turns of the filtering member by the spacing member 19. It then passes through the filtering cloth and along the drainage member until it reaches the spacing member 18, along which it flows up through the conduit 14, passageway 22, to the outlet pipe 23.

From the foregoing description, it is evident that this type of filter may be easily and inexpensively manufactured and is highly efficient, since it presents a very large filtering surface. Moreover, there are no joints through which unfiltered oil may pass to the outlet channel. It is, of course apparent that while the outlet conduit is conveniently located axially of the filtering member, it may be connected at any other point where it will provide a convenient outlet for the filtered oil. Furthermore it is to be understood that various structural modifications may be made without in any way departing from the spirit of the invention as set forth in the appended claims.

What I claim as new and desire to secure by United States Letters Patent is:

1. In a filter, a casing, a spiral filtering member comprising a drainage member and an enclosing envelope of filter cloth, a conduit leading from said unit through an aperture in the casing, a collar on said conduit, a second collar supported by said casing between which collars is gripped a portion of the filtering cloth, and means to exert pressure to force said collars into clamping relation.

2. In a filter, a casing, a spiral filtering member comprising a drainage member and an enclosing envelope of filter cloth, an axially arranged conduit leading from said unit through an aperture in the casing, a collar on said conduit, a second collar supported by said casing and cooperating with said first collar to grip a portion of the filter cloth and a spacing member extending across said drainage member in alignment with said conduit.

3. In a filter, a casing containing a spirally wrapped envelope of filtering material, a conduit leading from said envelope through an aperture in said casing, a helical spacing member extending from the end of said conduit across said envelope intermediate its ends, said envelope being wrapped in a double spiral about said spacing member, a second conduit communicating with said casing, a collar on said first conduit and arranged within said envelope and a second collar supported by said casing and co-operating with said first collar to grip a portion of the envelope.

In testimony whereof, I have signed my name to this specification.

ROBERT P. F. LIDDELL.